United States Patent
Chen et al.

(10) Patent No.: US 7,367,027 B1
(45) Date of Patent: *Apr. 29, 2008

(54) SYSTEM FOR GENERATING EFFICIENT AND COMPACT UPDATE PACKAGES

(75) Inventors: Shao-Chun Chen, Aliso Viejo, CA (US); James P. Gustafson, Irvine, CA (US); Jerry Barber, Renton, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

This patent is subject to a terminal disclaimer.

(21) Appl. No.: 10/646,319

(22) Filed: Aug. 22, 2003

Related U.S. Application Data (60) Provisional application No. 60/447,977, filed on Feb. 18, 2003, provisional application No. 60/441,867, filed on Jan. 22, 2003, provisional application No. 60/415,620, filed on Oct. 2, 2002, provisional application No. 60/405,253, filed on Aug. 22, 2002.

(51) Int. Cl.
   *G06F 9/44*   (2006.01)
   *G06F 12/00*  (2006.01)
(52) U.S. Cl. ............... 717/168; 717/169; 717/170; 707/203; 711/162
(58) Field of Classification Search ........ 717/168–172, 717/140–143
   See application file for complete search history.

(56) References Cited

U.S. PATENT DOCUMENTS

| | | | |
|---|---|---|---|
| 4,493,083 A * | 1/1985 | Kinoshita ............... 714/22 |
| 5,261,055 A | 11/1993 | Moran et al. ........... 395/275 |
| 5,442,771 A | 8/1995 | Filepp et al. ........... 395/650 |
| 5,479,637 A | 12/1995 | Lisimaque et al. ...... 395/430 |
| 5,579,522 A | 11/1996 | Christeson et al. ..... 395/652 |
| 5,596,738 A | 1/1997 | Pope ................... 395/430 |
| 5,598,534 A | 1/1997 | Haas .................. 395/200.09 |
| 5,608,910 A | 3/1997 | Shimakura ............. 395/670 |
| 5,623,604 A | 4/1997 | Russell et al. ......... 395/200.1 |
| 5,628,016 A * | 5/1997 | Kukol ................. 717/140 |
| 5,666,293 A | 9/1997 | Metz et al. ........... 395/200.5 |
| 5,752,039 A | 5/1998 | Tanimura ............. 395/712 |
| 5,778,440 A | 7/1998 | Yiu et al. ............. 711/154 |

(Continued)

FOREIGN PATENT DOCUMENTS

CA   2339923   3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Mary Steelman (57) ABSTRACT

A system for generating efficient and compact update packages makes it possible to process a source binary image of software/firmware for an electronic device and a target binary image in order to generate a compact update package. It generates bubbles information that is optionally packaged with the generated update package. Together, the bubbles information and the update package, when delivered to an electronic device, facilitate the upgrade of the electronic device to a new or different version. The system for generating efficient and compact update packages selectively employs residue generation/computation and entropy computation, in addition to other techniques, in order to make the update package more compact.

33 Claims, 3 Drawing Sheets

U.S. PATENT DOCUMENTS

| | | | | |
|---|---|---|---|---|
| 5,790,974 | A | 8/1998 | Tognazzini | 701/204 |
| 5,878,256 | A | 3/1999 | Bealkowski et al. | 395/652 |
| 5,960,445 | A | 9/1999 | Tamori et al. | 707/203 |
| 6,009,497 | A | 12/1999 | Wells et al. | 711/103 |
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 6,675,382 | B1 * | 1/2004 | Foster | 717/177 |
| 6,728,950 | B2 * | 4/2004 | Davis et al. | 717/136 |
| 6,968,543 | B2 * | 11/2005 | Takahara et al. | 717/140 |
| 7,069,545 | B2 * | 6/2006 | Wang et al. | 717/131 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

SYSTEM FOR GENERATING EFFICIENT AND COMPACT UPDATE PACKAGES

CROSS-REFERENCE TO RELATED APPLICATIONS/INCORPORATION BY REFERENCE

This patent application makes reference to, claims priority to and claims the benefit from U.S. Provisional Patent Application Ser. No. 60/405,253, entitled "Firmware Update Network And Process Employing Preprocessing Techniques," filed on Aug. 22, 2002, U.S. Provisional Patent Application Ser. No. 60/415,620, entitled "System for Generating Efficient And Compact Update Packages," filed on Oct. 2, 2002, U.S. Provisional Patent Application Ser. No. 60/441,867, entitled "Mobile Handset Update Package Generator That Employs Nodes Technique," filed on Jan. 22, 2003, and U.S. Provisional Patent Application Ser. No. 60/447,977, entitled "Update Package Generator Employing Partial Predictive Mapping Techniques For Generating Update Packages For Mobile Handsets," filed on Feb. 18, 2003.

The complete subject matter of each of the above-referenced United States patent applications is hereby incorporated herein by reference, in its entirety. In addition, this application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

This application is also related to the following co-pending applications, the complete subject matter of each of which is hereby incorporated herein by reference in its entirety:

| Ser. No. | Title | Filed | Inventors |
|---|---|---|---|
| 10/646,324 | Firmware Update Network and Process Employing Preprocessing Techniques | Aug. 21, 2003 | Chen Gustafson |
| 10/646,230 | Mobile Handset Update Package Generator That Employs Nodes Technique | Aug. 21, 2003 | Chen |
| 10/646,975 | Update Package Generator Employing Partial Predictive Mapping for Generating Update Packages for Mobile Handsets | Aug. 21, 2003 | Lilley |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

1. Field of the Invention

The present invention relates generally to the generation of update packages for software and firmware, and, more specifically, to the techniques employed in generating compact and efficient update packages that can be used to upgrade software/firmware from one version to another.

2. Background of the Art

Electronic devices, such as mobile phones and personal digital assistants (PDAs), often contain firmware and application software either provided by the manufacturer of the electronic devices, by telecommunication carriers, or by third parties. The firmware and application software often contain software bugs. New versions of the firmware and software are periodically released to fix the bugs or to introduce new features, or both. There is a fundamental problem in providing access to new releases of firmware and software. The electronic devices are often constrained in terms of resources, such as available memory. Attempts to upgrade firmware or software by end-users often result in making the device, or some features of the device inoperable. Specifically, changing firmware in electronic devices requires a great deal of caution as unsuccessful attempts may make the device inoperable. Also, attempts to upgrade firmware and/or software in constrained devices may be hampered by limited user interaction capabilities and slow communication speeds on these devices. In addition, determination of the version of firmware or software that may currently be executed on the electronic devices may not be an easy task, especially if such determination must be made with minimal end-user interaction.

When an electronic device manufacturer/supplier wants to upgrade an electronic device user's executable applications, a binary difference file may be distributed from the supplier to the user. The user may then update the executable image with that difference file. Often, the changes required for the upgrade may be small, however, the binary difference file may be very large, and that may cause problems during the upgrading process.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a method for generating efficient and compact update packages in a generation system that comprises a parser for generating distance files between the source image and the target image; a bubble generator for generating bubbles; a configuration manager for facilitating configuration of the memory of the electronic device; a bubble layout manager for modifying the source image to look similar to the target image, the bubble layout manager having a bubbler and a predictor for aligning objects between the source and target images; and a generator for generating update packages, the generator having a residue processing unit for minimizing the number of instructions requiring large spaces in the update package, and an update package output for generating the update package. The system may further comprise a an entropy calculator for calculating the entropy of a segment of data, and a compression unit for facilitating compression of the update package. The method for generating efficient and compact update packages may involve determining files for the source image and the target image; parsing the determined files for the source image and the target image to create distance files for the images; splitting the distance files into one or more parts; verifying the distances determined between the source image and the target image; generating bubble information; configuring the bubble information according to configuration settings; applying the bubble information to the source image; generating an update package; and outputting the update package and the bubble information.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
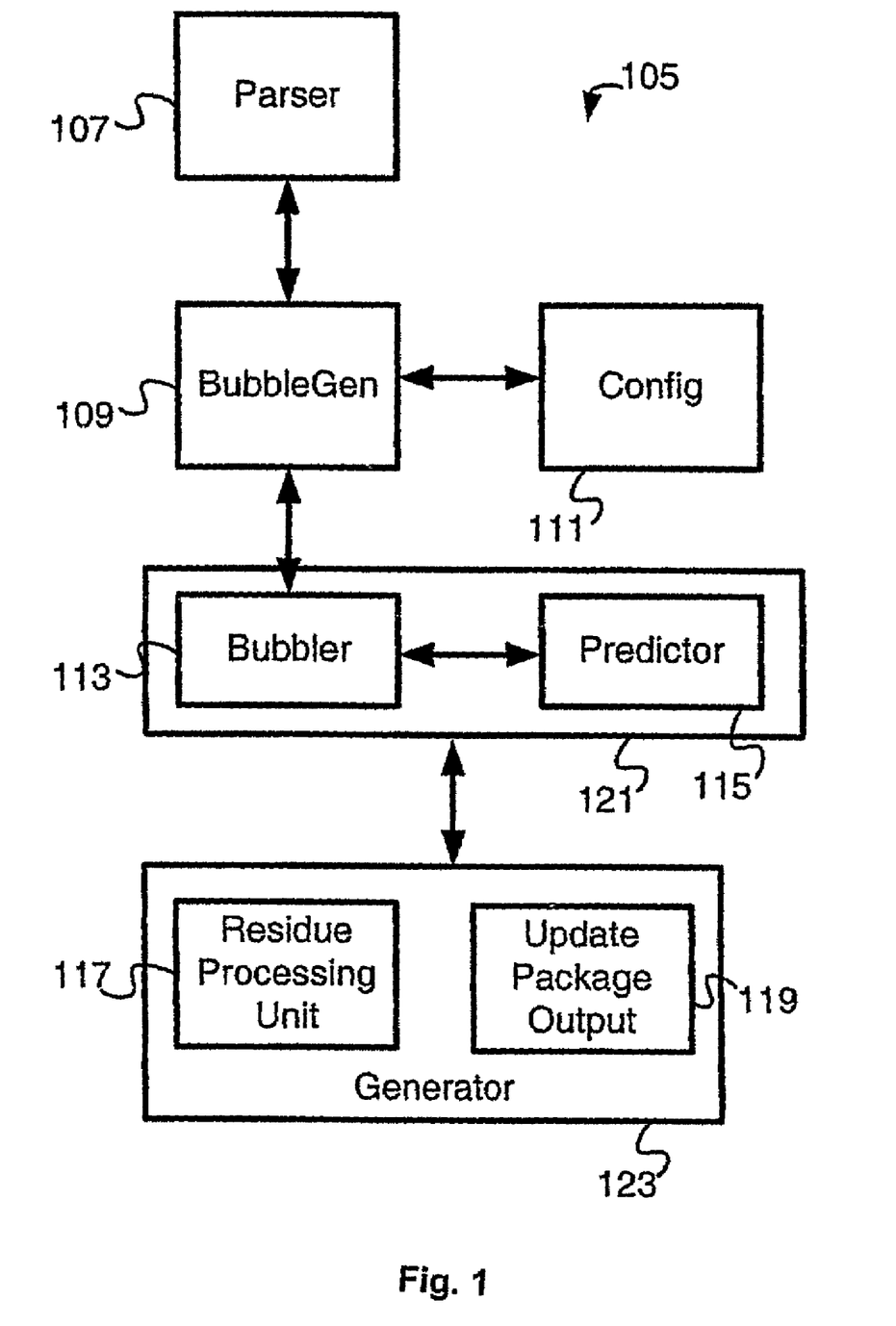
FIG. 1 illustrates a block diagram of an example of a system for generating efficient and compact update packages, in accordance with an embodiment of the present invention.

FIG. 1 illustrates a block diagram of an example of a system for generating efficient and compact update packages 105, in accordance with an embodiment of the present invention. The system 105 comprises a parser 107, a bubble generator 109, a configuration manager 111, a bubble layout manager 121, and a generator 123. The bubble layout manager 121 comprises a bubbler 113 and a predictor 115. The generator 123 comprises a residue processing unit 117 and an update package output 119.

The parser 107 may be used for parsing "elf" files or executable images to determine the location of symbols and values of offsets for branch-link instructions, load instructions, pointers, etc. The parser 107 may be employed to generate distance files or ".dist" files. A distance file contains "distance values" of a source image and a target image of a firmware/software of an electronic device, where the target image may be an updated or upgraded version of the source image of the firmware/software.

In one embodiment, the parser 107 may be employed to pre-process map or "map" files and symbol or ".sym" files to generate ".dist" files. Hence, ".dist" files may be generated for both the source and the target binary images of firmware/software of an electronic device.

The bubble generator 109 may then process the ".dist" files generated for the source and the target images by the parser 107. The bubble generator 109 may then output a list of bubbles into a bubbles file. The list of bubbles may contain "Worm" bubbles, indicating a growth in the size of objects, functions, and/or sections of memory in the target image in comparison with the corresponding object or function in the source image of firmware/software. The list of bubbles may also contain "Black" bubbles, indicating a reduction in the size of objects, functions, and/or sections of memory in the target image in comparison with the corresponding object or function in the source image of firmware/ software.

In one embodiment, the bubble generator 109 may process the ".dist" files generated for the source and the target images by the parser 107, to generate configuration or ".cfg" files. The bubble generator 109 may employ one or more ".dist" files, one for each type of memory component in an electronic device, such as ROM, RAM, FLASH, etc. The bubble generator 109 may then generate a single output file, for example "bubbles.cfg."

The configuration manager 111 facilitates the specification of the configuration of the memory of the electronic device on which the source and the target images of the firmware/software may be executed. In one embodiment, the configuration manager 111 may facilitate the generation of a configuration file, or a ".cfg" file. The configuration file may specify a number of configuration parameters including a base address of the RAM, a top address+1 of the RAM (that may be called RAMlimit), a top address+1 of the binary image (that may be called IMAGElimit). The configuration file may also specify a top address+1 of the code section that may be required for some microprocessor architectures, such as THUMB (that may be called CODElimit). In addition, the configuration file may specify a top address+1 of the boot block (that may be called Bblimit), a base address of ROM (that may be called ROMbase), an enable or disable instruction disassembler indicator that may be called ARMbl, etc.

The output of the bubble generator 109 may be processed by the bubble layout manager 121. The bubble layout manager 121 may process the source image of a firmware/ software for an electronic device, and may manipulate the aforementioned source image to line up symbolic addresses, such as addresses in branch links, pointers, etc. with corresponding symbolic addresses in the target image of the firmware/software for the electronic device. As a result, the source image may be modified to look similar to the target image, in preparation for the process of generating an update package by the generator 123. The predictor 115 may be employed to encapsulate platform-specific issues and platform-specific processing. The predictor 115 may be utilized to align objects or code in the source image with objects or code in the target image. The predictor 115 may compare bytes from the source image to bytes from the target image to establish an alignment between the two images, or between portions of the two images.

The generator 123 generates update packages that indicate the difference between any two given versions of firmware/ software. The differences may be expressed using a set of instructions and associated data. In one embodiment, the system may utilize instructions such as CPY, DUP, SET, SETR, and DEL, explained hereinafter.

In one embodiment, the generator 123 may process the output of the bubble layout manager 121 to determine an appropriate bank order of updates. The bank order may contain the order in which sections of the objects or code from the source and target images of the firmware/software may be updated. The bank order may be determined based on the order that may provide the most size-efficient update package. Details regarding the significance of the bank order choice are explained hereinafter.

Once the bank order is determined, the generator 123 may generate the update package. While generating the update package, the generator 123 may utilize the residue processing unit 117 to minimize the number of SET and SETR instructions used in the update package being generated. The residue processing unit 117 may generate compact segments of SET and SETR instructions that form a portion of a generated update package for the firmware/software of the electronic device. The update package output 119 may then save the generated update package into a file, external device, an output stream, etc.

The update package generated for a difference file may include instructions such as, CPY, DUP, SET, SETR, and DEL, as mentioned hereinabove. DUP may be used to indicate that a specified number of bytes remain the same in a target image from the source image of the firmware/software. CPY may be used to indicate that a specified number of bytes is the same as the preceding equal number of bytes. DEL may be used to indicate that a specified number of bytes in the source image may not appear in the target image. SET and SETR are used to add new and changed number of bytes into the target image that do not occur in the source image. SET uses completely new information to add to the image, whereas SETR may use an existing segment of information. A benefit of using SETR is that, depending on the stage of the generation process, SETR may utilize a segment of information that appears in the source image, the modified/updated source image, or the target image. In such a case, the bank order may be considered. The order in which segments of the memory are updated determines at any stage which segments are available as source, updated, or target. The order that provides the optimal/minimal number of instructions, such as SET and SETR, may be the optimal bank order.

Figure 2:
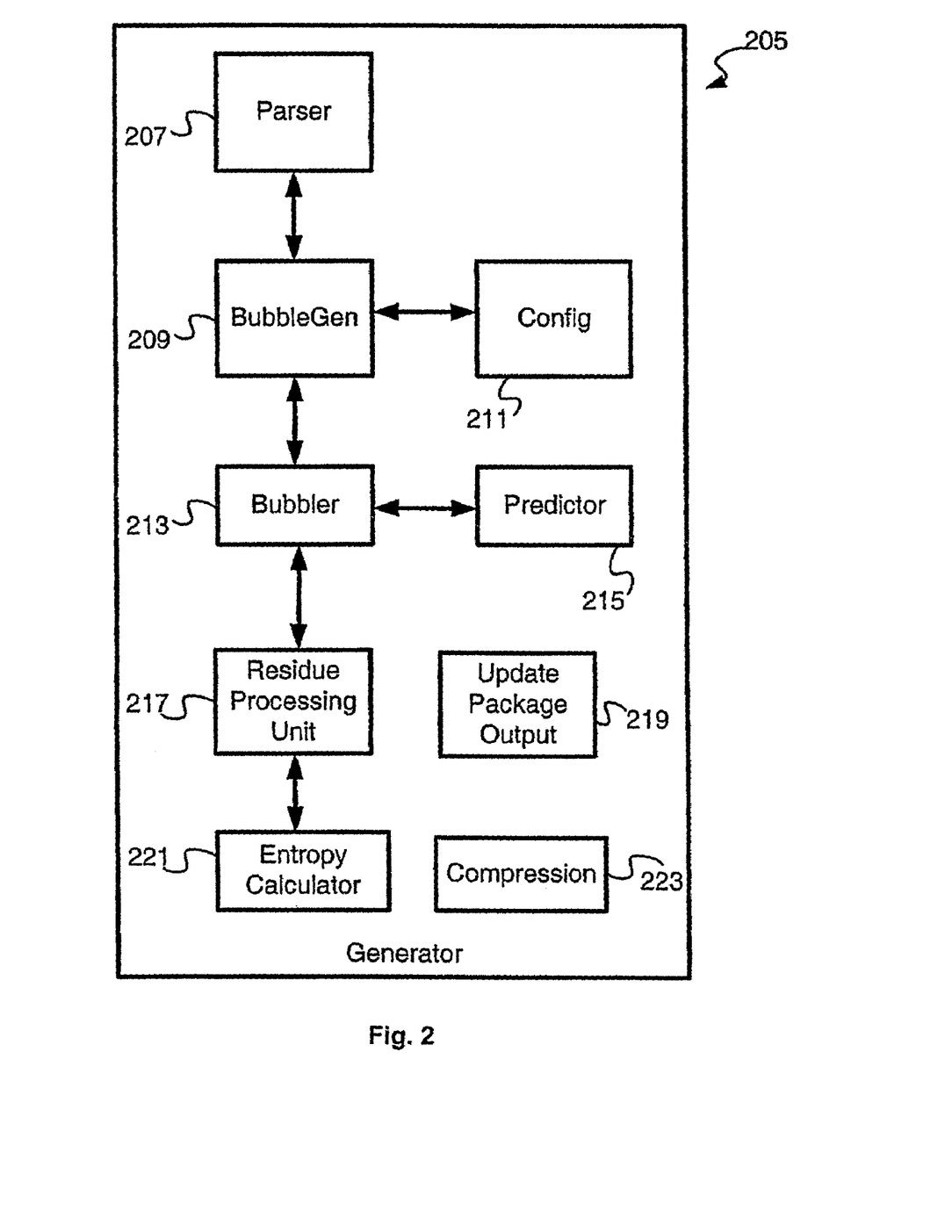
FIG. 2 illustrates a block diagram of an example of a generator for generating efficient and compact update packages, in accordance with an embodiment of the present invention.

FIG. 2 illustrates a block diagram of an example of a generator 205 for generating efficient and compact update packages, in accordance with an embodiment of the present invention. The generator 205 comprises a parser 207, a bubble generator 209, a configuration manager 211, a bubbler 213, a predictor 215, a residue processing unit 217, an update package output 219, an entropy calculator 221, and a compression unit 223. The preprocessing steps that may be utilized to prepare the binary images of firmware/software for the generation of an update package may include the processing of binary files, such as ".bin" files, map files, such as ".map" files, symbol files, such as ".sym" files, etc. for both the source image and the target image.

In one embodiment, the preprocessing steps, that may be conducted by the generator 205 may comprise generation of binary files. Such binary files may include a binary image file corresponding to the source binary image in addition to bubbles that make it look similar to the target binary image. Another binary file may be a binary image file that may include preprocessing instructions in addition to the bubbles used in updating the source image to the target image. The generator 205 may subsequently process the source binary image file that contains the bubbles or the source binary file that contains the bubbles and the preprocessing instructions, along with the target binary image file to generate an update package.

The entropy calculator 221 may be employed by the residue processing unit 217 to calculate the entropy of the data associated with a set-buffer, which is a buffer of data assembled from one or more SET or SETR instructions of an update package. In one embodiment, the set-buffer may contain the data associated with all SET and SETR instructions encountered during any given stage of the processing by the generator 205. Based on the entropy calculated, the residue processing unit 217 may select a SET instruction or a SETR instruction to represent creation/duplication/modification of a current segment of a piece of code or module within the firmware/software being processed.

In one embodiment, the entropy may be calculated by calculating the frequency of occurrence of each byte in a buffer, calculating the probability of each byte occurring, and employing the frequency of occurrence and/or the probability in an entropy function. The code fragment shown below illustrates an example of an entropy calculation, where prob is an array of calculated probabilities, and prob[i] refers to an $i^{th}$ element in the array:

for (i=0; i<256; i++)
{
entropy += (prob[i] != 0.0 ? prob[i] * log(1.0/prob[i] / log(2.0) : 0.0);

Using the SET instruction usually yields high entropy values, because it introduces a set of new values for a certain number of bytes. However, an alternative embodiment may reduce the entropy of the data introduced by the SET instruction, and as a result offer a high compression rate to make an update package more efficient. An alternative embodiment may utilize subtracting SET data from corresponding data in the source, and using the difference between the target and source data instead of just the target data. For example, the SET or target data may look like:

0x08 0x25 0xF2 0x04 0x08 0x26 0xF2 0x04 0x08 0x30 0x4A 0x0C 0x08 0x31 0x4A 0x0C

This pattern has moderate entropy and may offer a compression rate near 2:1. The source data corresponding to the SET or target data may look like:

0x08 0x25 0xF2 0x08 0x08 0x26 0xF2 0x08 0x08 0x30 0x4A 0x04 0x08 0x31 0x4A 0x04

The difference between the SET data and the source data would look like:

0x00 0x00 0x00 0xFC 0x000x000x00 0xFC 0x000x000x000x080x000x000x000x08

In this case, the entropy of the difference is extremely low, which may offer a much higher compression rate. Therefore, it may be more desirable to use the SET instruction with the difference data rather than the target data. This technique is not limited to the SET instruction. In another case the SETR instruction may offer better results by finding sections in the source, modified, or target images that may provide the smallest difference between sections of data, hence providing sequences with lower entropy and better compression rates. Better results may be achieved by utilizing combinations of SET and SETR instructions. A further enhancement may compute the entropy before and after calculating the residual for the different sections or segments of code and/or data, and for each section or segment, saving the data with the lowest entropy to the update package.

The compression unit 223 may facilitate compression of update packages based on one or more compression techniques. In one embodiment, the compression unit 223 may provide support for zlib-based compression, as well as other commercial compression techniques, such as LZ compression, pkzip, etc. A high compression rate results in the generation of more efficient update packages in a system.

The bubble information generated by the generator 205 may be packaged along with the update package in one embodiment, or packaged separately from the generated update package in another embodiment.

In one embodiment, the system may keep a "rough" estimate of locations of sections of the source data where evaluations of entropy values and compression may provide better results. In one embodiment, a large fraction of SET instructions may be preceded by a copy instruction, or CPY. In such an embodiment, if a pointer into the source data is kept for the last copy instruction, the matched SET data will likely reside at that pointer location plus the size of the copy instruction, i.e. the number of bytes of data copied. This embodiment assumes locality of data.

Figure 3:
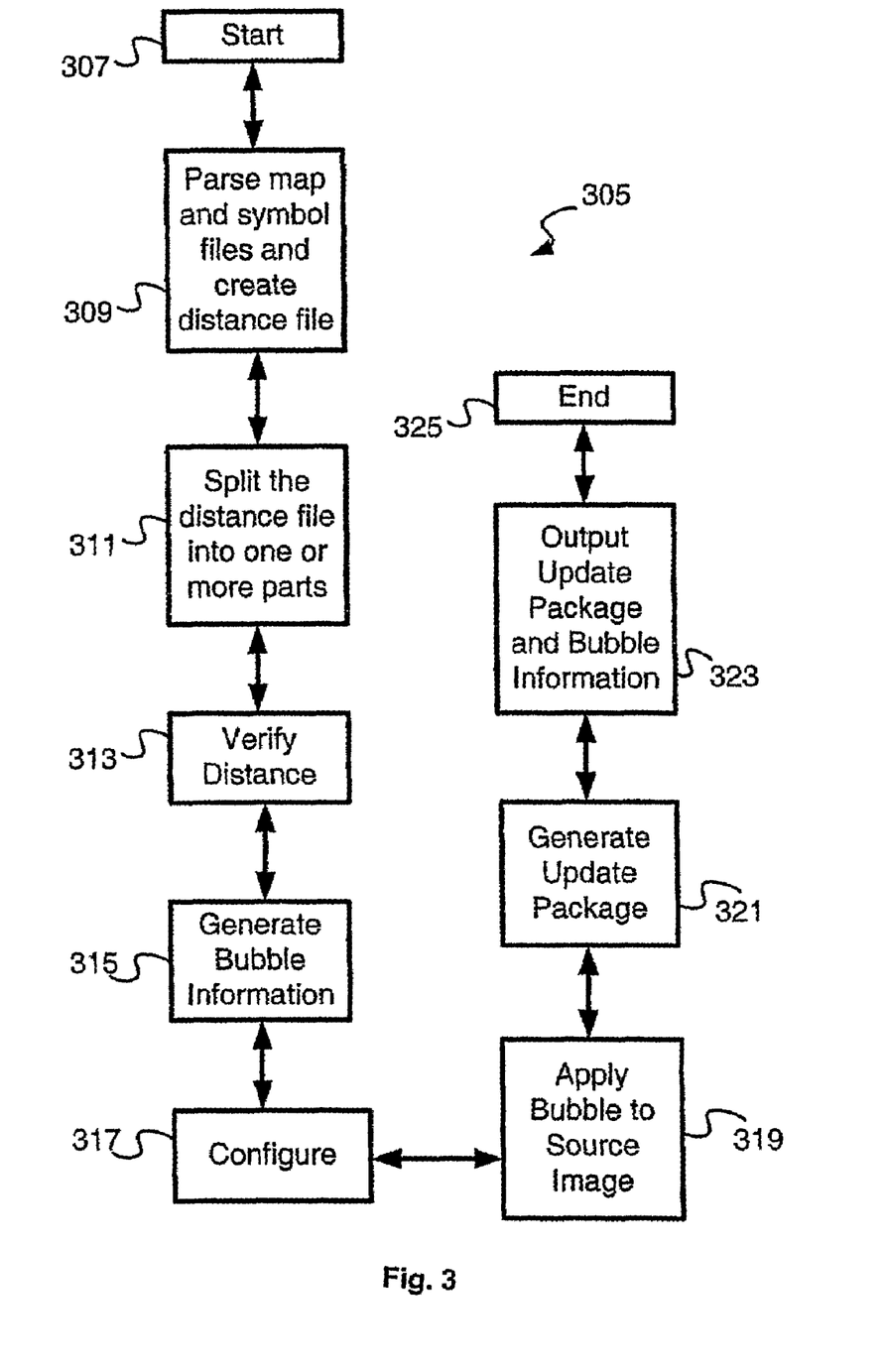
FIG. 3 illustrates a block diagram of an example of a flow model for generating efficient and compact update packages, in accordance with an embodiment of the present invention.

FIG. 3 illustrates a block diagram of an example of a flow model 305 for generating efficient and compact update packages, in accordance with an embodiment of the present invention. The flow model 305 shows exemplary steps of a process for generating efficient and compact update packages utilizing bubbles information to make the update packages more compact and efficient. The exemplary process of generating efficient and compact update packages starts at a block 307 where map or ".map" files and/or symbol or ".sym" files for the source binary image of a firmware/software and the target binary image of the firmware/software may be determined. For instance, the ".bin," ".map," and ".sym" files for both the source and target images of the firmware/software may be identified and accessed.

At a next block 309, the map and symbol files may be parsed to create one or more distance or ".dist" files. Then, at a next block 311, the distance files may be split, if necessary, into one or more parts. These parts may correspond to different sections of code or memory. For example, if ROM, RAM, and IRAM sections are employed in the source and target images, the distance files for each of these memory sections may be separated and saved in different files.

At block 313, the distances may be verified between the source and target images. In one embodiment, each of the distance files, if more than one exists (for example, a distance file for the different sections of memory), may be verified.

At block 315, bubble information may be generated. When the bubble information is generated, the system may utilize a preferred distance specified by a user or accessed from a default configuration setting. The preferred distance utilized may be computed based on heuristics. In one embodiment, the bubble information generated may be combined into one ".cfg" file, where the sequence of bubble information may be based on the order of the addresses of the various sections of memory of a binary image. For example, if the memory map of an electronic device for the source/target image, ordered from top to bottom, is ROM, RAM, and IRAM, then the bubble information may be arranged in that order.

Once the bubble information is generated in block 315, the configuration information may be retrieved and processed in a step illustrated by block 317. Later, at a next block 319, the source image may be manipulated to make it similar in appearance to the target image by applying the bubble information generated in the earlier block 315. The application of the bubble information to the source image may be performed by a bubbler utilizing a predictor. Once the bubble information is applied to the source image, the update package may be generated in a next block 321. The generation of the update package may also employ techniques such as residue processing to make the generated update package more compact and efficient. Additionally, compression techniques may also be employed.

A next block 323 is where the update package and the bubble information generated may be packaged together or separately and outputted. In one embodiment, the update package and the bubble information generated may be packaged together and saved in a file. The process for generating efficient and compact update packages then ends at block 325.

The system for generating efficient and compact update packages generates bubbles information that may be packaged within the generated update package. The bubbles information, included in the update package, when delivered to an electronic device, facilitates the upgrade of the electronic device firmware/software to a new version.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for generating efficient and compact update packages for updating contents of memory in an electronic device utilizing source and target images of the contents, the system comprising:
   at least one processor communicatively coupled to storage containing code executable by the at least one processor, the code comprising:
   a parser for generating distance files comprising distance information representing location differences between code or objects in the source image and the target image;
   a bubble generator for generating bubble information from the distance information, the bubble information representing addition and deletion of memory space within the source image to more closely align the code or objects in the source and target images;
   a configuration manager for facilitating configuration of memory elements of the electronic device;
   a bubble layout manager for modifying the alignment of the source image based on the target image, using the bubble information; and
   a generator for generating at least one update package from the modified source image and the target image, for processing in the electronic device to update the memory.

2. The system according to claim 1 wherein the parser preprocesses map files for generating the distance files.

3. The system according to claim 1 wherein the parser preprocesses symbol files for generating the distance files.

4. The system according to claim 1 wherein the bubble generator processes the distance files to generate a list of bubbles.

5. The system according to claim 1 wherein the bubble generator outputs a file containing a list of the generated bubbles.

6. The system according to claim 1 wherein the parser generates a plurality of distance files associated with a plurality of memory components in the electronic device.

7. The system according to claim 6 wherein the bubble generator processes the plurality of distance files to generate a plurality of corresponding files containing bubbles information.

8. The system according to claim 7 wherein the bubble generator utilizes the plurality of files containing bubbles information for generating an output file containing a portion of the generated bubbles.

9. The system according to claim 1 wherein the bubble layout manager comprises:
   a bubbler; and
   a predictor for aligning objects between the source and target images.

10. The system according to claim 1 wherein the update package comprises a set of instructions and data.

11. The system according to claim 10 wherein the generator comprises:
a residue processing unit for minimizing the number of instructions in the update package; and an update package output for generating the update package.

12. The system according to claim 1 wherein the generator determines an appropriate bank order of updates.

13. The system according to claim 12 wherein the appropriate bank order provides a more size-efficient update package.

14. The system according to claim 12 wherein the appropriate bank order provides a lesser number of instructions in the update package.

15. The system according to claim 1 wherein the system further comprises:
an entropy calculator for calculating the entropy of a segment of data; and
a compression unit for facilitating compression of the update package.

16. The system according to claim 15 wherein the residue processing unit utilizes the calculated entropy to select a set of instructions to determine the update package.

17. The system according to claim 16 wherein the entropy is calculated for different sets of instructions to determine the instruction set yielding the smallest entropy value.

18. A method for generating efficient and compact update packages for updating contents of memory in an electronic device, utilizing source and target images of the contents, the method comprising the steps of:
identifying files comprising code or objects of the source image;
identifying files comprising code or objects of the target image;
creating one or more distance files for the source and the target images, the one or more distance files comprising information representing differences of location of the code or objects in the source and target images;
generating bubble information using the one or more distance files, the bubble information representative of addition and deletion of memory space within the source image;
applying the bubble information to the source image to create a modified source image in which the code or objects more closely align with corresponding code or objects in the target image;
generating an update package using the modified source image and the target image; and
outputting the update package and the bubble information to the electronic device for processing to update the memory.

19. The method according to claim 18 wherein the identified files for the source and the target images are parsed to create the distance files.

20. The method according to claim 18 wherein the distance files are split into at least two parts.

21. The method according to claim 20 wherein the distance files are split into parts corresponding to different sections of code.

22. The method according to claim 18 further comprising the step of verifying the distances between the source image and the target image.

23. The method according to claim 18 wherein the bubble information is configured according to configuration settings.

24. The method according to claim 23 wherein the configuration settings are specified by a user.

25. The method according to claim 23 wherein the configuration settings are default configuration settings.

26. The method according to claim 18 wherein the distance files are split into parts corresponding to different sections of memory.

27. The method according to claim 18 wherein the application of the bubble information to the source image is performed by a bubbler.

28. The method according to claim 27 wherein the bubbler utilizes a predictor.

29. The method according to claim 18 wherein the generation of the update package utilizes residue processing.

30. The method according to claim 18 wherein the generation of the update package utilizes compression.

31. The method according to claim 18 wherein the update package and the bubble information are packaged together and outputted.

32. The method according to claim 18 wherein the update package and the bubble information are packaged and outputted separately.

33. The method according to claim 18 wherein the update package and the bubble information are packaged together and saved in a file.

* * * * *

UNITED STATES PATENT AND TRADEMARK OFFICE
CERTIFICATE OF CORRECTION

| | |
|---|---|
| PATENT NO. | : 7,367,027 B1 |
| APPLICATION NO. | : 10/646319 |
| DATED | : April 29, 2008 |
| INVENTOR(S) | : Shao-Chun Chen et al. |

Page 1 of 1

It is certified that error appears in the above-identified patent and that said Letters Patent is hereby corrected as shown below:

In column 6, line 27, delete "0x000x000x00" and insert -- 0x00 0x00 0x00 --, therefor.

In column 6, line 28, delete "0x000x000x000x080x000x000x000x08" and insert -- 0x00 0x00 0x00 0x08 0x00 0x00 0x00 0x08 --, therefor.

Signed and Sealed this

Second Day of September, 2008

JON W. DUDAS
*Director of the United States Patent and Trademark Office*